United States Patent
Katsuki et al.

Patent Number: 6,021,003
Date of Patent: Feb. 1, 2000

[54] OPTICAL DEVICE

[75] Inventors: Takashi Katsuki; Ippei Sawaki; Michio Miura; Satoshi Ueda; Fumitaka Abe, all of Kawasaki, Japan

[73] Assignee: Fujitsu Limited, Kawasaki, Japan

[21] Appl. No.: 09/151,028

[22] Filed: Sep. 10, 1998

[30] Foreign Application Priority Data

Mar. 9, 1998 [JP] Japan ................. 10-056794

[51] Int. Cl.$^7$ .................................. G02B 27/10
[52] U.S. Cl. .......................... 359/619; 359/621
[58] Field of Search ...................... 359/619, 621, 359/622, 623, 624, 626

[56] References Cited

U.S. PATENT DOCUMENTS

| | | | |
|---|---|---|---|
| 5,550,656 | 8/1996 | Sprague et al. | 359/40 |
| 5,615,048 | 3/1997 | Davies et al. | 359/622 |
| 5,650,876 | 7/1997 | Davies et al. | 359/622 |
| 5,768,023 | 6/1998 | Sawaki et al. | 359/622 |
| 5,822,125 | 10/1998 | Meyers | 359/621 |

FOREIGN PATENT DOCUMENTS

| | | |
|---|---|---|
| 49-8893 | 2/1974 | Japan . |
| 55-83005 | 6/1980 | Japan . |
| 57-66414 | 4/1982 | Japan . |
| 58-34419 | 2/1983 | Japan . |
| 6-208081 | 7/1994 | Japan . |

*Primary Examiner*—Georgia Epps
*Assistant Examiner*—Ricky Mack
*Attorney, Agent, or Firm*—Armstrong, Westerman, Hattori, McLeland & Naughton

[57] ABSTRACT

An optical device including an optical imaging system for forming a real image of an object on a light-receiving surface, the optical imaging system including first and second cylindrical lenses and first and second intermediate lenses, each of the intermediate lenses being composed of a plurality of lens elements arrayed in a line, the first and second cylindrical lenses being opposed to each other so that generatrices thereof are parallel to each other, the first and second intermediate lenses being arranged between the first and second cylindrical lenses in a direction of the generatrices so that a light beam emanated from the object is condensed onto the light-receiving surface through the first cylindrical lens, the first intermediate lens, the second intermediate lens and the second cylindrical lens, wherein each of the lens elements is formed of a one-dimensional binary lens having a light-condensing property only in the direction of the generatrices, whereby a real image by the first and second cylindrical lenses and an erect image by the first and second intermediate lenses are formed perpendicular to each other on the light-receiving surface.

14 Claims, 9 Drawing Sheets

OPTICAL DEVICE

CROSS-REFERENCES TO RELATED APPLICATIONS

This application is related to Japanese Patent Application No. HEI 10(1998)-056794 filed on Mar. 9, 1998 whose priority is claimed under 35 USC §119, the disclosure of which is incorporated herein by reference in its entirety.

BACKGROUND OF THE INVENTION

1. Field of the Invention

The present invention relates to an optical device, and more particularly to an optical device for reading an image, which is used in a facsimile apparatus, image scanner, LED printer or the like. Specifically, the present invention relates to an optical device for forming an image of an object on a light-receiving surface at a magnification of 1:1.

2. Description of the Related Art

For a facsimile apparatus, image scanner, LED printer or the like, an optical device is used in which an image on a line is formed on a sensor or a photoreceptor drum at a magnification of 1:1.

Known examples of these optical devices include a device in which an array of rod lenses made of cylindrical transparent bodies having a refractive index distribution and an array of convex lenses are stacked in three layers (See, for example, Japanese Examined Patent Publication No. SHO 49(1974)-8893, Japanese Unexamined Patent Publication No. SHO 57(1982)-104923, and Japanese Unexamined Patent Publication No. SHO 57(1982)-66414) and a device in which arrays of thick convex lenses are stacked in two layers (See, for example, Japanese Unexamined Patent Publication No. SHO 55(1980)-83005).

Also, a device in which two cylindrical lens arrays and two cylindrical lenses are used (See, for example, Japanese Unexamined Patent Publication No. HEI 6(1994)-208081) and a device in which a cylindrical mirror, a lens and a cylindrical lens are used (See, for example, Japanese Unexamined Patent Publication No. SHO 58(1983)-34419) are known.

In an optical device used in a facsimile apparatus or an image scanner for reading an image, high utilization efficiency of light is desired for saving power and, at the same time, a large image size is desired for increasing the mounting tolerances.

However, in such a conventional optical device, when an attempt is made to decrease the F number by enlarging the aperture of the lens or by decreasing the working distance in order to increase the image size and to gain the image brightness, integration of the refraction angle of the light beam passing through a peripheral portion of the lens increases, so that the aberration increases unfavorably.

SUMMARY OF THE INVENTION

The present invention has been made in view of these circumstances and the purpose thereof is to provide an optical device having a bright and large size image with a simple and inexpensive construction by combining a cylindrical lens and a one-dimensional binary lens.

Accordingly, the present invention provides an optical device including an optical imaging system for forming a real image of an object on a light-receiving surface, the optical imaging system comprising first and second cylindrical lenses and first and second intermediate lenses, each of the intermediate lenses being composed of a plurality of lens elements arrayed in a line, the first and second cylindrical lenses being opposed to each other so that generatrices thereof are parallel to each other, the first and second intermediate lenses being arranged between the first and second cylindrical lenses in a direction of the generatrices so that a light beam emanated from the object is condensed onto the light-receiving surface through the first cylindrical lens, the first intermediate lens, the second intermediate lens and the second cylindrical lens, wherein each of the lens elements is formed of a one-dimensional binary lens having a light-condensing property only in the direction of the generatrices, whereby a real image by the first and second cylindrical lenses and an erect image by the first and second intermediate lenses are formed perpendicular to each other on the light-receiving surface.

BRIEF DESCRIPTION OF THE DRAWINGS

The present invention will be better understood from the following detailed description of preferred embodiments of the invention, taken in conjunction with the accompanying drawings, in which.

DETAILED DESCRIPTION OF THE PREFERRED EMBODIMENTS

The optical device of the present invention is constructed to include a pair of cylindrical lenses having parallel generatrices and a pair of one-dimensional binary lens arrays (intermediate lenses) having a light-condensing property only in the direction of the generatrices of the cylindrical lenses. The array of one-dimensional binary lenses are arranged on the inside of the cylindrical lenses in the direction of the generatrices. In the image reading apparatus, the generatrices of the two cylindrical lenses correspond to the main scanning direction, and the array of binary lenses are arranged in a line in the direction of the generatrices.

Here, it is to be noted that the cylindrical lenses need not be formed of a portion of a cylinder or a cylindrical surface.

Examples of the cylindrical lenses also include those having a bottom surface represented by a secondary surface or another curved surface with only a small aberration as a lens. The two cylindrical lenses may be disposed so that their planar column surfaces are facing each other, or facing away from each other, or are facing in the same direction.

In the reading apparatus using the lens array, it is required that each of the lenses constituting the array forms an erect image at a magnification of 1:1 in order to produce a continuous image. However, this condition of forming the erect image must be satisfied only in the main scanning direction, so that either an erect image or an inverted image can be formed in the sub scanning direction.

Therefore, in the image reading apparatus using the optical device of the present invention, an erect or inverted image is formed at a magnification of 1:1 in the sub scanning direction by means of the two cylindrical lenses having generatrices parallel to the main scanning direction, and an erect image is formed at a magnification of 1:1 in the main scanning direction by means of the array of one-dimensional binary lenses having a light-condensing property only in the main scanning direction.

Figure 13A:
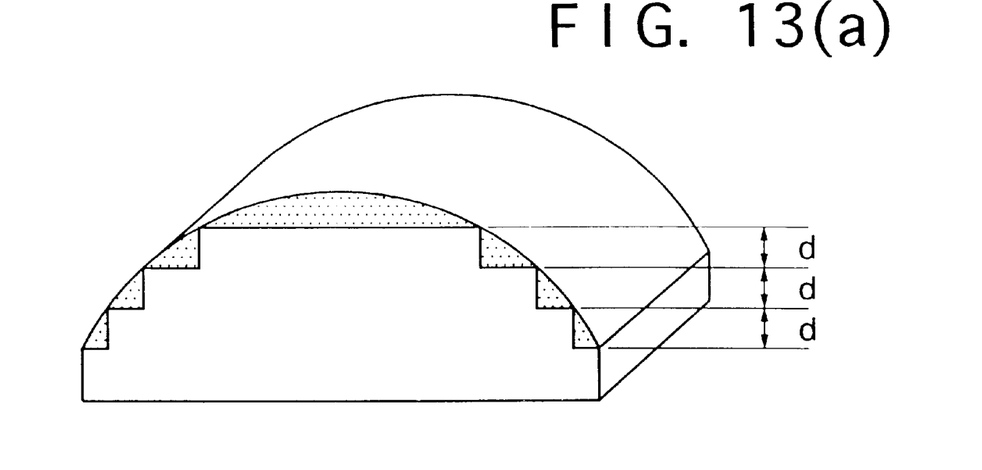
FIGS. 13(a), 13(b), and 13(c) are perspective views showing various lens forms.
Figure 13B:
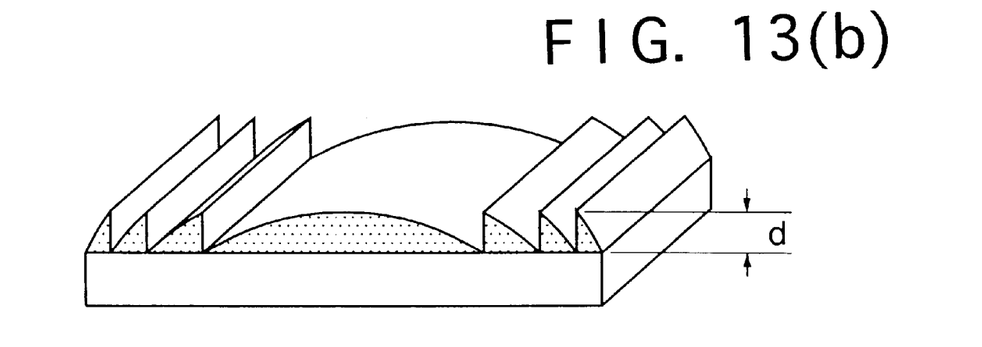
Figure 13C:
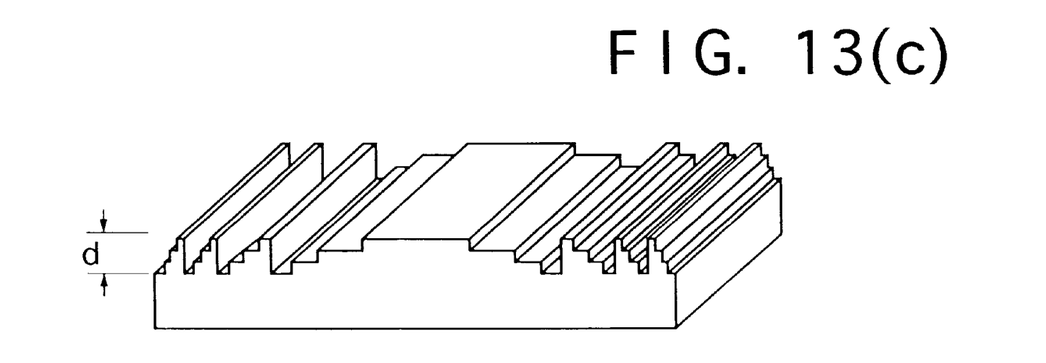

A one-dimensional binary lens is a lens as shown in FIG. 13(c). A one-dimensional Fresnel lens as shown in FIG. 13(b) is obtained by removing, from a normal refraction-type cylindrical lens as shown in FIG. 13(a), a volume portion which is partitioned by the lens and gives an optical path difference d of an integer multiple of the wavelength, i.e. an equiphase surface which does not give any influence on the light-condensing effects. The one-dimensional binary lens is a step-like approximation of the one-dimensional Fresnel lens shown in FIG. 13(b). Accordingly, the height d of the one-dimensional binary lens is an integer multiple of the wavelength, so that the one-dimensional binary lens shows a light-condensing property similar to that of the cylindrical lens shown in FIG. 13(a) with respect to a light beam having that wavelength. Also, as shown in FIG. 13(c), the size of the one-dimensional binary lens is sufficiently smaller than that of the cylindrical lens, so that it is easy to control its shape and to fabricate a lens having a short focal length.

The one-dimensional binary lens is fabricated, for example, by the ultraviolet transcription method using an acrylic ultraviolet-curing resin, or by the injection molding method or the thermal pressing method using a polycarbonate resin, an acrylic resin or a PMMA resin. On the other hand, the cylindrical lens is formed by the injection molding method or the thermal pressing method using one of the above resins. Therefore, the one-dimensional binary lens array can be easily molded integrally with the cylindrical lens.

In a conventional optical device in which two cylindrical lens arrays are disposed between two cylindrical lenses for forming a mirror image at a magnification of 1:1, a brighter image can be formed by increasing the width of the optical element in the sub scanning direction.

However, if an attempt is made to increase the width of the optical element in the sub scanning direction while maintaining a large image size, there will be a greater difference between the optical path of the light beam passing through the central portion of the lens and the optical path of the light beam passing through the peripheral portion of the lens in the cylindrical lens having a generatrix parallel to the main scanning direction according as the width of the optical element in the sub scanning direction increases. Namely, the aberration increases, so that an image blur will occur. In order to compensate for the aberration, it is required that the cylindrical lens array is made of lenses having a variable focal length in the sub scanning direction, so that a good precision will be required in the alignment in the sub scanning direction when the cylindrical lenses are arranged in an array, rendering the manufacturing process all the more difficult. Also, the shape of the lens itself will be complicated, leading to increased costs.

On the other hand, in the present invention, the aberration can be easily be compensated for by using one-dimensional binary lenses and reducing the focal length of the lens stepwise or continuously in the sub scanning direction from the center of the lens to the periphery of the lens.

Also, in the present invention, since the one-dimensional binary lenses can be manufactured integrally on the rear surface of the cylindrical lens as described before, the number of components can be reduced to three even if a light-shielding member to be disposed between the one-dimensional binary lenses is included. Therefore, alignment in positioning the components can be very easily achieved. At the same time, reduction of the number of components leads to decrease in the number of interfaces between different media. This makes it possible to reduce the effects of stray light beams caused by reflection at the interfaces.

Also, by using one-dimensional binary lenses and color filters corresponding to wavelengths of red light, green light, and blue light, it is possible to selectively form an image with a respective wavelength. Further, images can be formed on parallel three lines for three wavelengths, respectively, by dividing a lens surface of at least one of the first and second cylindrical lenses into three portions or by providing a prism surface on the rear surface of the cylindrical lens.

Thus, by forming color images of an object on different light-receiving surfaces respectively for three fundamental colors, an optical system can be realized in which the three colors of the object can be read simultaneously. This makes the reading speed higher as compared with the case in which the three colors are read with a single line sensor by time division system.

Embodiments

With reference to the attached drawings, the optical device of the present invention is now detailed by way of embodiments in which the optical device is applied to the image reading apparatus of an image scanner. In the drawings, like numerals represent like constituent elements in the present invention.

First Embodiment

Figure 1:
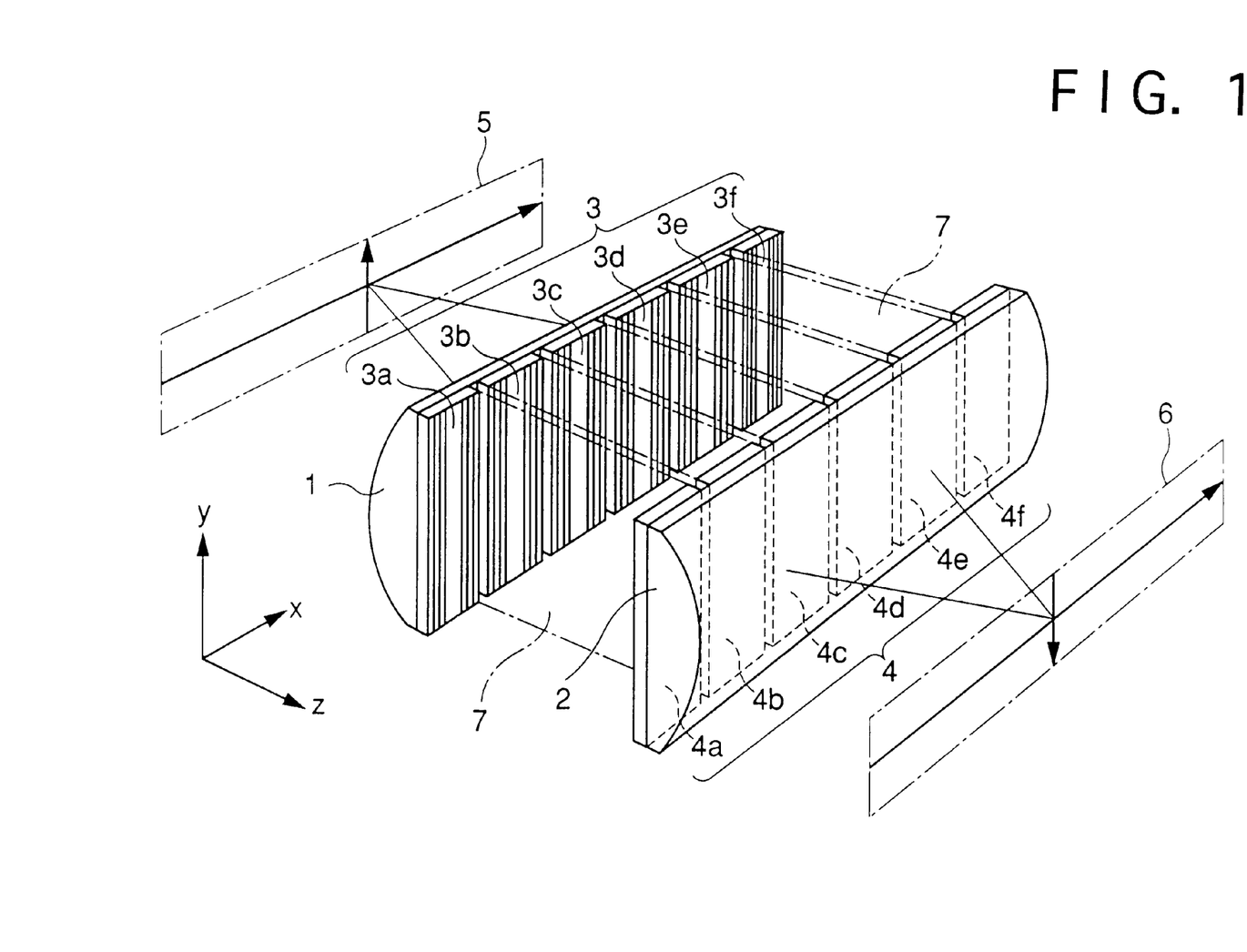
FIG. 1 is a perspective view showing a first embodiment of the present invention.
Figure 2:
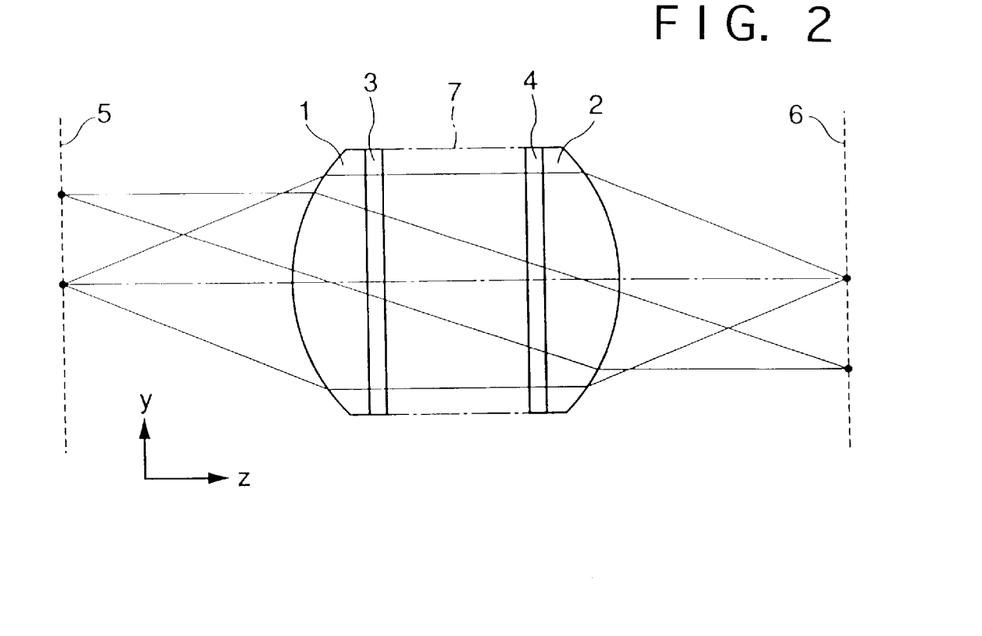
FIG. 2 is a side view showing the first embodiment of the present invention.
Figure 3:
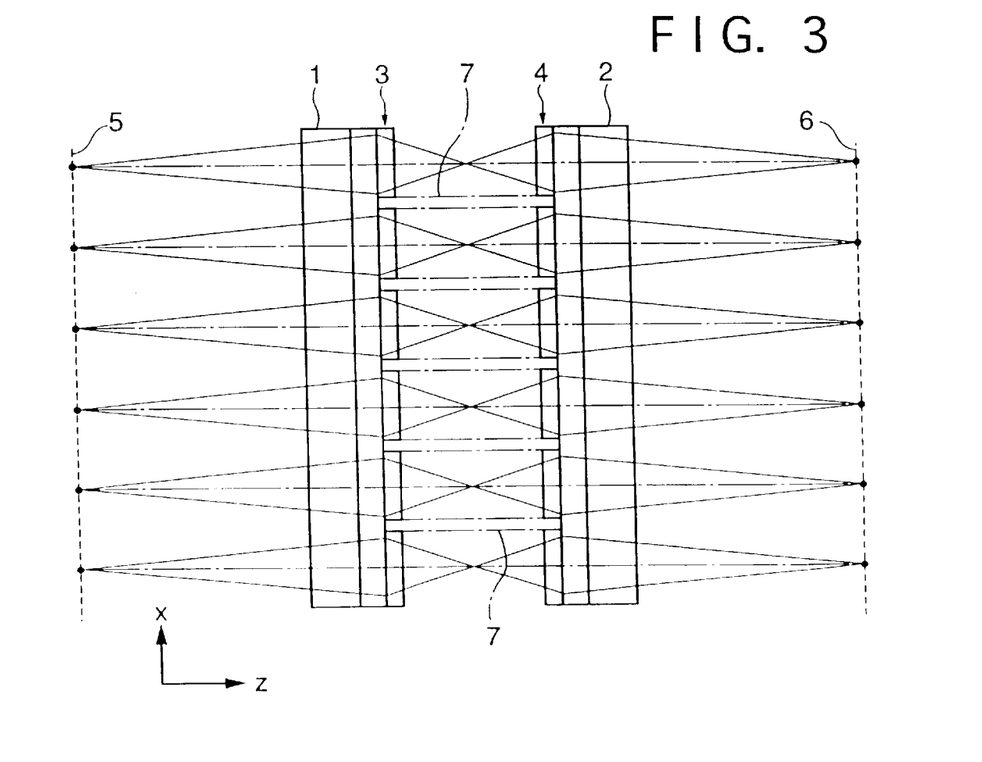
FIG. 3 is a plan view showing the first embodiment of the present invention.

A first embodiment of the present invention is now explained with reference to FIGS. 1 to 3. As shown in these drawings, each of a cylindrical lens 1 and a cylindrical lens 2 has a curved front surface and a planar rear surface. The cylindrical lenses 1, 2 are disposed with their front surfaces facing away from each other and their rear surfaces facing each other so that their generatrices are parallel to the main scanning direction (x-direction). One-dimensional binary lenses 3a to 3f are formed integrally on the rear surface of the cylindrical lens 1 and are arranged in a line in the main scanning direction (x-direction) to form a binary lens array 3.

Similarly, one-dimensional binary lenses 4a to 4f are formed integrally on the rear surface of the cylindrical lens 2 and are arranged in a line in the main scanning direction (x-direction) to form a binary lens array 4. Each of the one-dimensional binary lenses 3a to 3f and 4a to 4f has a light-condensing property only in the main scanning direction, and each of the cylindrical lenses 1, 2 has a light-condensing property only in the sub scanning direction (y-direction).

When a surface 5 of an object (original document sheet) is illuminated with a light source (not shown), a light beam emanated from the object surface 5 is condensed onto a light-receiving surface 6 through the cylindrical lens 1, the binary lens array 3, the binary lens array 4, and the cylindrical lens 2. On the light-receiving surface 6, therefore, an inverted image in the y-direction is formed by the cylindrical lenses 1, 2 as shown in FIG. 2, and an erect image in the x-direction is formed by the binary lens arrays 3, 4 as shown in FIG. 3.

Here, the one-dimensional binary lenses 3a to 3f and 4a to 4f constituting the binary lens arrays 3, 4 are constructed in such a manner that the focal length of each of the one-dimensional binary lenses 3a to 3f and 4a to 4f changes continuously or stepwise in the sub scanning direction in accordance with a change in optical path from the object surface 5 to the light-receiving surface 6 so as to compensate for an aberration generated at the peripheral portion of the cylindrical lenses 1, 2. In other words, each of the one-dimensional binary lenses 3a to 3f and 4a to 4f has the smallest focal length at its center and the focal length increases according as it approaches the edges in the sub scanning direction.

Also, it is preferable to insert a light-shielding plate 7 parallel to the z-direction between the binary lens arrays 3, 4 so that the light beam emanated from each of the one-dimensional binary lenses 3a to 3f is incident only into its corresponding one of the one-dimensional lenses 4a to 4f. This prevents a cross talk between binary lenses adjacent to each other in the x-direction.

The light-shielding plate 7 is formed of a plastic plate or a metal plate. In order to reduce the effects of light beams reflected at its surface, the surface of the light-shielding plate 7 may be designed to have various shapes or, alternatively, the surface may be subjected to roughening treatment by chemical processing or sandblasting.

The cylindrical lens 1 and the binary lens array 3, and the cylindrical lens 2 and the binary lens array 4 are respectively molded integrally by the injection molding method or the thermal pressing method using polycarbonate, acrylic resin, or PMMA resin. Instead of being integrally molded, the cylindrical lens and the binary lens array may be fabricated separately and then be bonded together.

According to the first embodiment of the present invention, since the binary lens array is used to form an erect image in the main scanning direction, the following effects are provided:

(1) The distance from the object surface to the light-receiving surface will be short;
(2) Two lenses having different light-condensing properties can be integrally molded; and
(3) Since the optical properties of one-dimensional binary lenses can be easily adjusted, correction of the aberration is facilitated, whereby the image blurring caused by the difference in optical path can be prevented.

Second Embodiment

Figure 4:
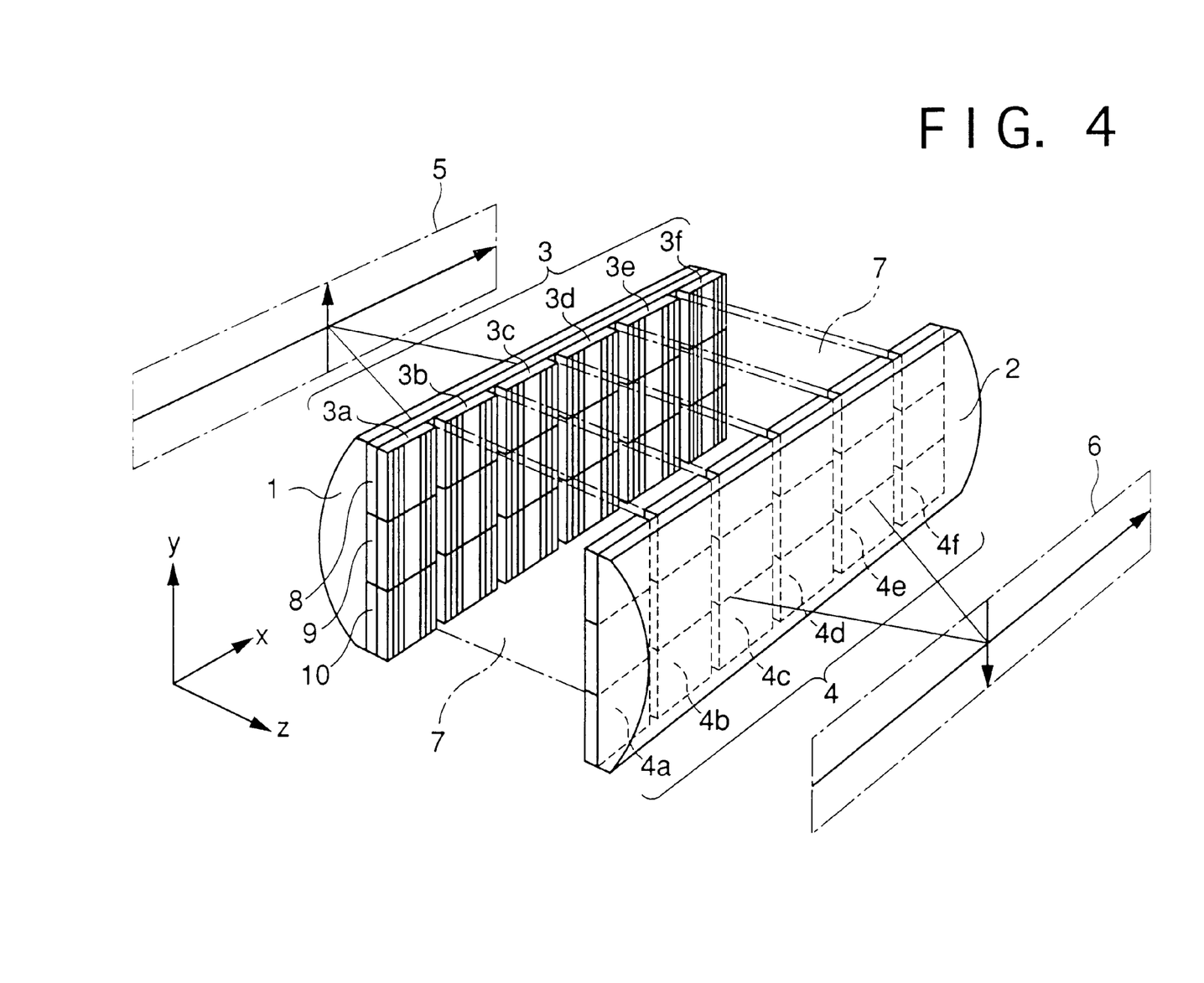
FIG. 4 is a perspective view showing a second embodiment of the present invention.
Figure 5:
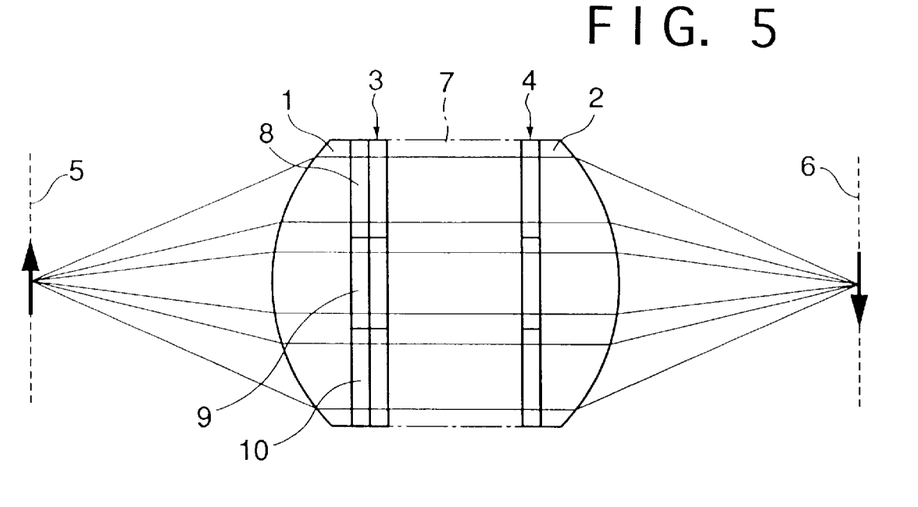
FIG. 5 is a side view showing the second embodiment of the present invention.
Figure 6:
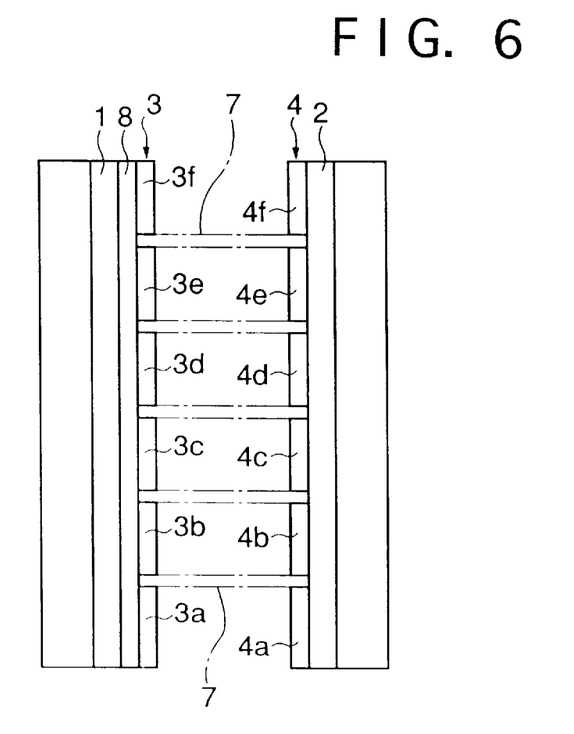
FIG. 6 is a plan view showing the second embodiment of the present invention.

A second embodiment of the present invention is now detailed with reference to FIGS. 4 to 6.

As shown in these drawings, between the cylindrical lens 1 and the binary lens array 3, there are provided a color filter 8 transmitting only the red light, a color filter 9 transmitting only the green light, and a color filter 10 transmitting only the blue light, which are arranged parallel to each other in the main scanning direction.

Each of the one-dimensional binary lenses 3a to 3f and 4a to 4f is divided into three segments so as to correspond to each region through which the light beam from one of the color filters 8, 9, and 10 is transmitted. Each of the segments has a wavelength property suitable for the wavelength of the light beam from the corresponding color filter. In other words, each of the one-dimensional binary lenses 3a to 3f and 4a to 4f includes segments for red, green, and blue.

Further, each of the segments is constructed so that its focal length changes in the sub scanning direction in correspondence with the optical path of the light beam passing therethrough, as in the first embodiment. The other constructions are the same as in the first embodiment. Alternatively, the cylindrical lenses 1 and 2 may be disposed so that their front surfaces face each other to interpose the binary lens arrays 3, 4 therebetween. In this case, although the binary lens array and the cylindrical lens cannot be integrally molded, it is possible to fabricate a cylindrical lens having a smaller focal length as compared with the case in which the curved surfaces of the cylindrical lenses face away from each other.

When the object surface 5 is illuminated with a white light source (not shown), the light beam emanated from the object surface 5 passes through the cylindrical lens 1 and is transmitted through the color filters 8, 9, and 10 to be converted into three kinds of light beams, i.e. red, green, and blue, which then pass through the respective segments for red, green, or blue, of the one-dimensional binary lenses 3a to 3f and 4a to 4f and through the cylindrical lens 2 to be focused onto the light-receiving surface 6 in the same manner as in the first embodiment.

Thus, the light beam emanated from the object surface 5 is separated into three light beams of different colors and then, after passing through the segments of the binary lenses suitable for the wavelengths of the respective colors, these light beams are synthesized into a single image on the light-receiving surface 6 by the cylindrical lens 2. Accordingly, it is possible to compensate for the chromatic aberration of the optical system. Also, since the focal length of the binary lens is set in accordance with the optical path, the image blurring can be prevented.

Third Embodiment

Figure 7:
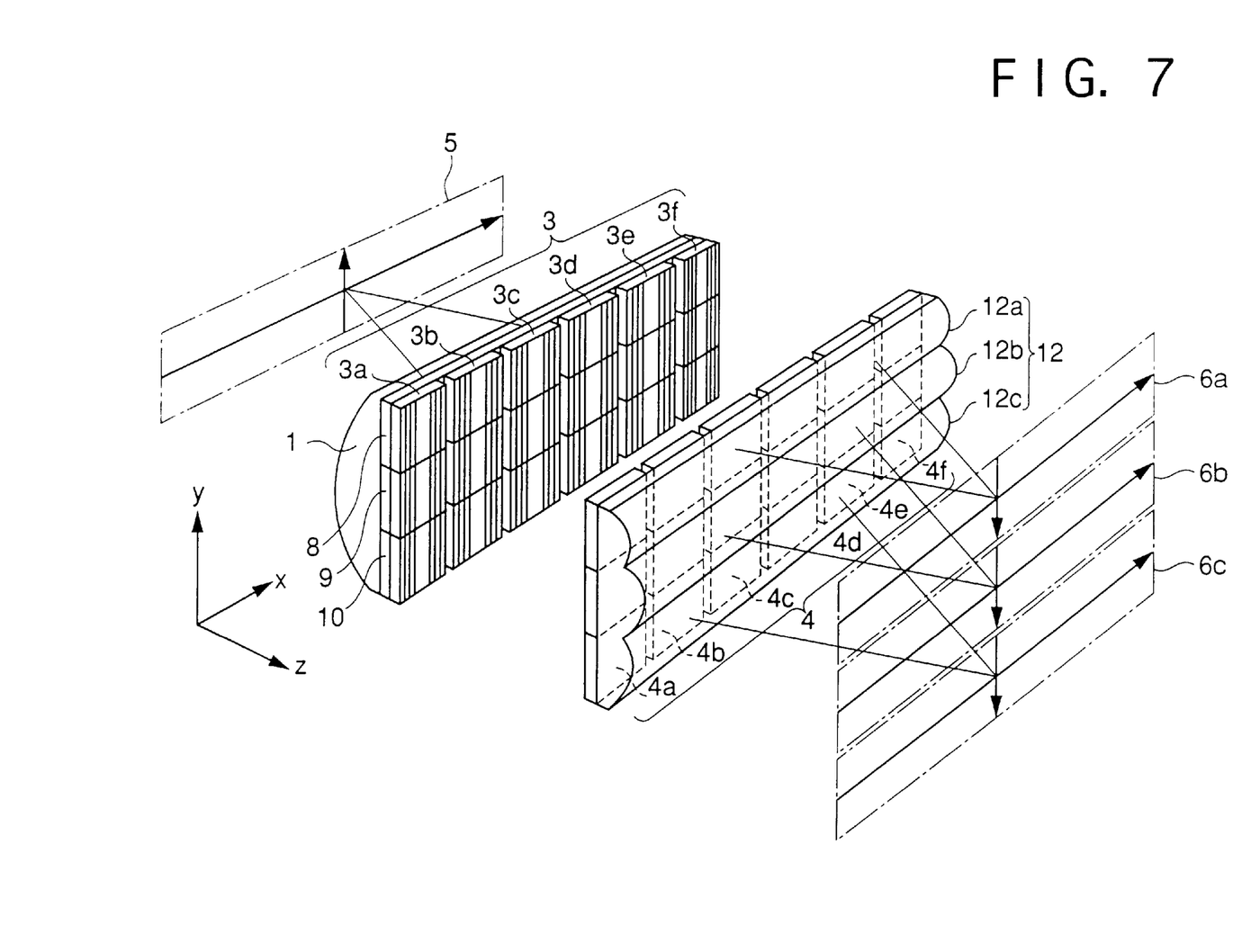
FIG. 7 is a perspective view showing a third embodiment of the present invention.
Figure 8:
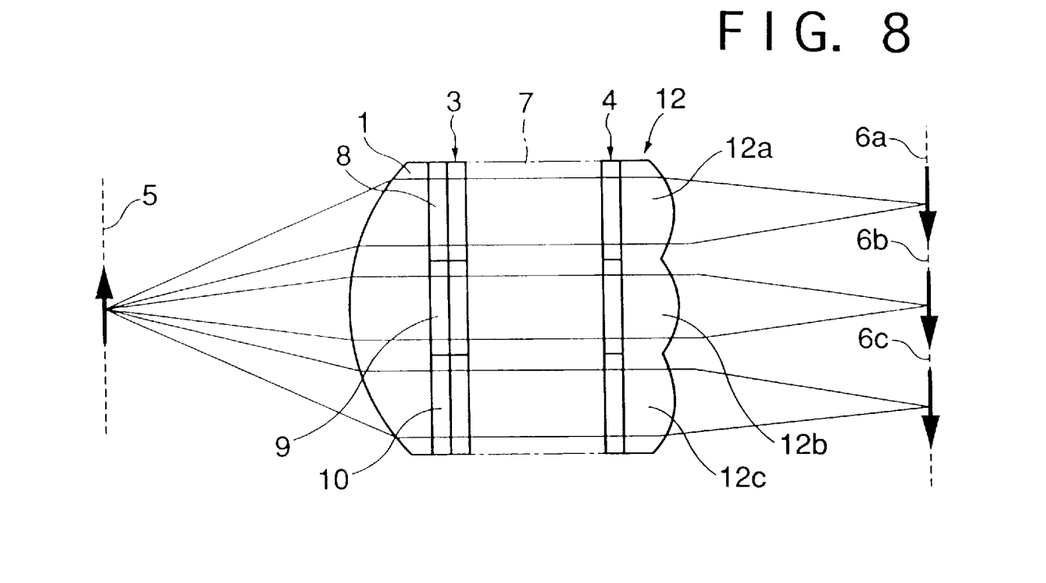
FIG. 8 is a side view showing the third embodiment of the present invention.
Figure 9:
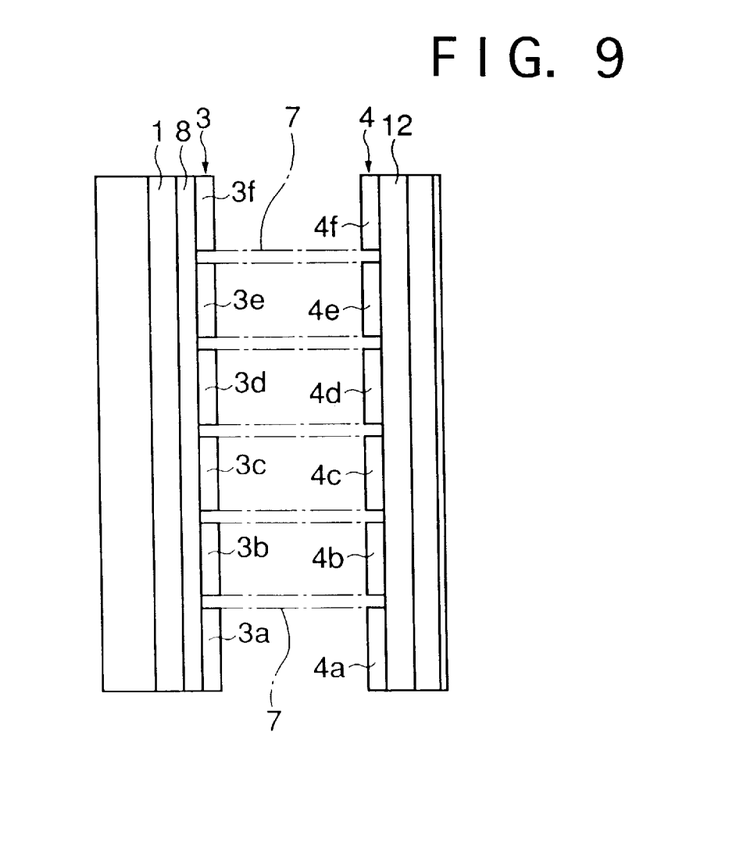
FIG. 9 is a plan view showing the third embodiment of the present invention.

A third embodiment of the present invention is now detailed with reference to FIGS. 7 to 9. This embodiment is constructed in the same manner as in the second embodiment except that the cylindrical lens 2 (FIG. 4) of the second embodiment is substituted with a cylindrical lens 12. The cylindrical lens 12 is composed of three segments 12a, 12b, and 12c obtained by dividing the curved front surface of the cylindrical lens 12 into three portions in the sub scanning direction in correspondence with the color filters 8, 9 and 10.

When the object surface 5 is illuminated by a white light source (not shown), the light beams emanated from the object surface 5 impinge into the cylindrical lens 1. Among the light beams exiting from the cylindrical lens 1, the one transmitted through the color filter 8 is converted into a red light beam, which then passes through the segments for red of the one-dimensional binary lenses 3a to 3f and 4a to 4f and through the segment 12a of the cylindrical lens 12 to be focused onto the light-receiving surface 6a.

Similarly, among the light beams exiting from the cylindrical lens 1, the ones transmitted through the color filers 9, 10 are converted into a green light beam and a blue light beam, respectively, which then pass through the segments for green and blue of the one-dimensional binary lenses 3a to 3f and 4a to 4f and through the segments 12b, 12c of the cylindrical lens 12 to be focused onto the light-receiving surfaces 6b, 6c, respectively. In other words, the light beam emanated from the object surface 5 is separated into three light beams of different colors which are focused onto the light-receiving surfaces 6a to 6c positioned parallel to the main scanning direction, respectively.

Accordingly, by providing a light-receiving element (photoreceptor element) for each of the light-receiving surfaces 6a to 6c, it is possible to read the image data of the three colors simultaneously with good efficiency. Also, since the focal length of the one-dimensional binary lens is set in accordance with the optical path, the image blurring can be prevented.

Fourth Embodiment

Figure 10:
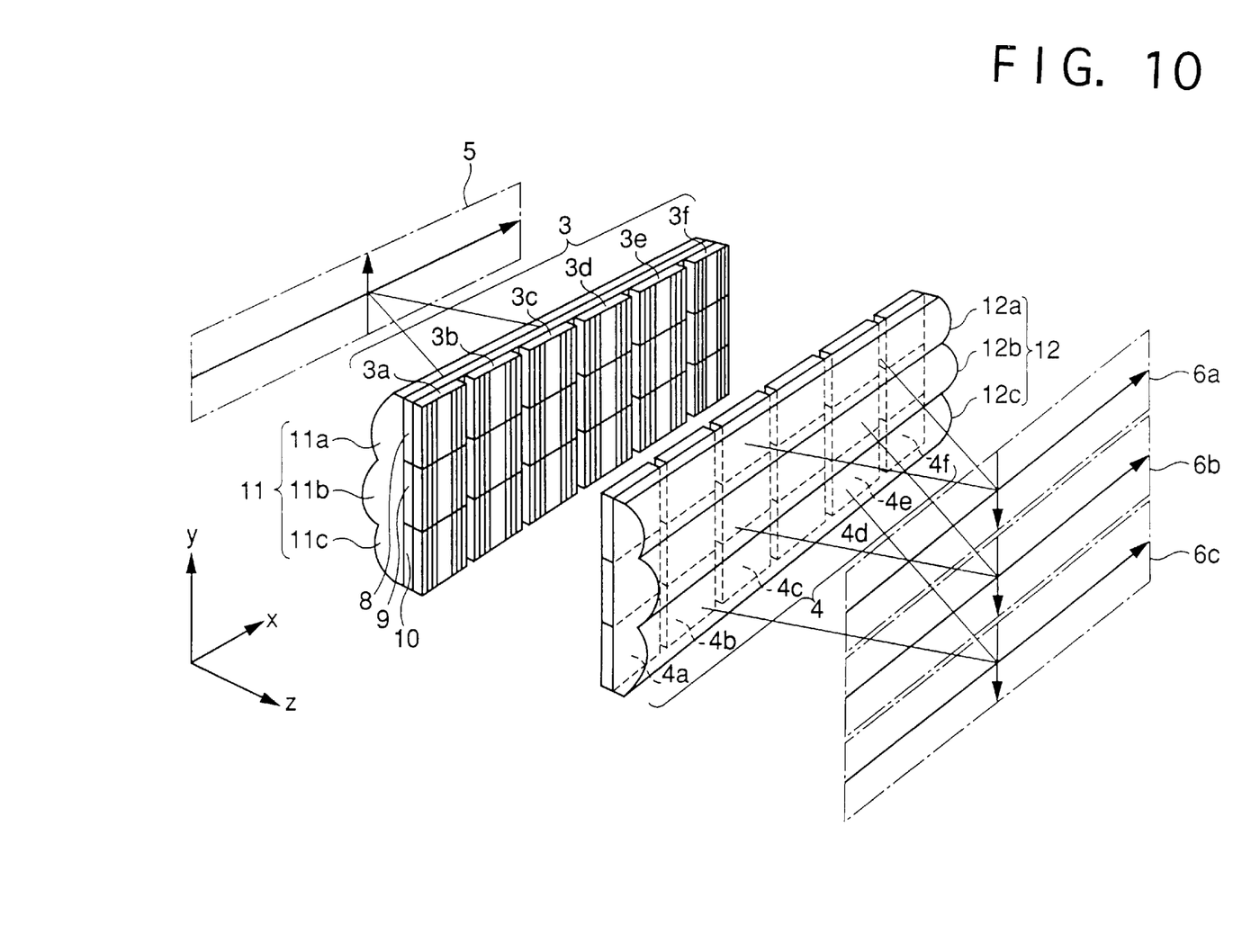
FIG. 10 is a perspective view showing a fourth embodiment of the present invention.

FIG. 10 is a perspective view showing a fourth embodiment of the present invention. This embodiment is constructed in the same manner as in the third embodiment except that the cylindrical lens 1 (FIG. 7) of the third embodiment is replaced with a cylindrical lens 11 and, in accordance therewith, the shape of the curved surface of the cylindrical lens 12 is re-designed. The cylindrical lens 11 is composed of three segments 11a, 11b, and 11c obtained by dividing the curved front surface of the cylindrical lens 11 into three portions in the sub scanning direction in correspondence with the color filters 8, 9 and 10 in the same manner as the cylindrical lens 12. Further, the curved surface of each segment in the cylindrical lenses 11, 12 is designed to correct the chromatic aberration of the wavelength of the corresponding filter. This can correct the chromatic aberration of the cylindrical lenses in the sub scanning direction.

When the object surface 5 is illuminated by a white light source (not shown), the light beam emanated from the object surface 5 impinges into the cylindrical lens 11. The light beam incident into the segment 11a passes through the color filter 8, the segments for red of the binary lenses 3a to 3f and 4a to 4f, and the segment 12a to be focused onto the light-receiving surface 6a.

The light beam incident into the segment 11b passes through the color filter 9, the segments for green of the binary lenses 3a to 3f and 4a to 4f, and the segment 12b to be focused onto the light-receiving surface 6b. The light beam incident into the segment 11c passes through the color filter 10, the segments for blue of the binary lenses 3a to 3f and 4a to 4f, and the segment 12c to be focused onto the light-receiving surface 6c.

Fifth Embodiment

Figure 11:
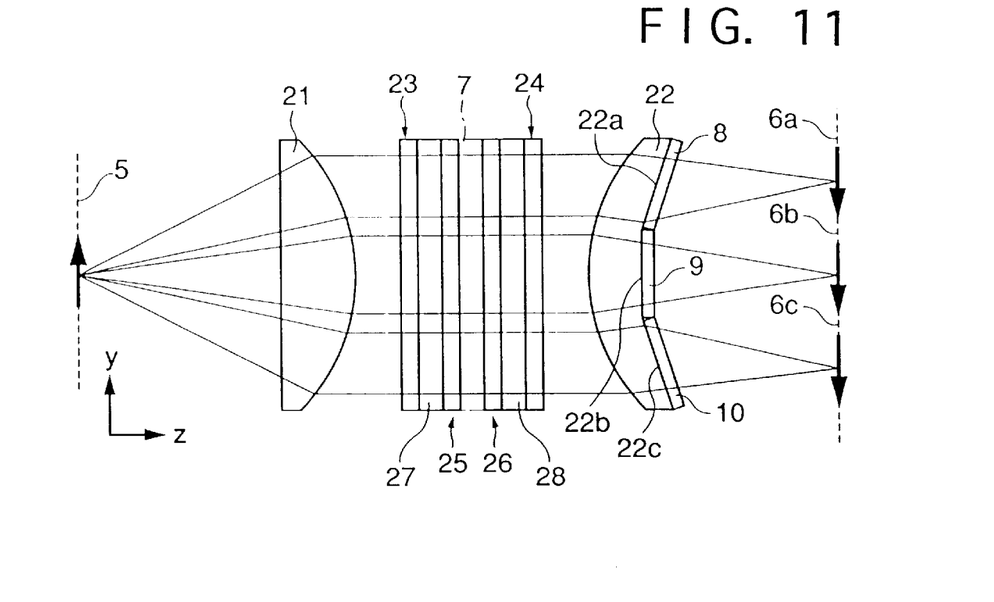
FIG. 11 is a side view showing a fifth embodiment of the present invention.
Figure 12:
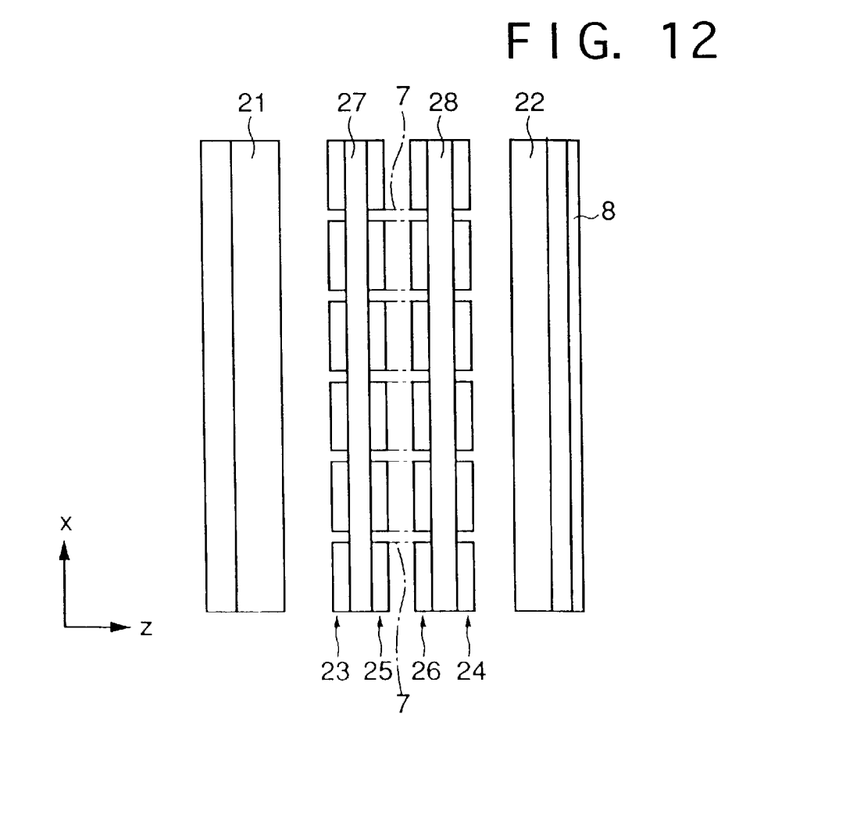
FIG. 12 is a plan view showing the fifth embodiment of the present invention.

A fifth embodiment of the present invention is now detailed with reference to FIGS. 11 and 12. As shown in these drawings, the cylindrical lens 21 has a curved front surface and a planar rear surface. The cylindrical lens 22 has a curved front surface, and its rear surface includes a prism refraction surface separated into three planes 22a, 22b, 22c in the sub scanning direction. By the prismatic function of the planes 22a, 22b, 22c, the light beam emanated from the object surface 5 is separated and focused on the three light-receiving surfaces 6a, 6b, 6c which are positioned parallel to the main scanning direction.

The planes 22a, 22b, 22c are provided with color filters 8, 9, 10 for red light, green light, and blue light, respectively. The cylindrical lenses 21 and 22 are disposed so that their front surfaces face each other and their generatrices are parallel to the main scanning direction.

Between the cylindrical lenses 21, 22, there are disposed binary lens arrays 23, 25 formed on two sides of a transparent substrate 27 and binary lens arrays 26, 24 formed on two sides of a transparent substrate 28. Each of the binary lens arrays 23, 25, 26, 24 is composed of a plurality of one-dimensional binary lenses having a light-condensing property only in the main scanning direction. The one-dimensional binary lenses are arranged in a line in the main scanning direction. A light-shielding plate 7 is inserted between the binary lens arrays 25, 26 in the same manner as in the previous embodiments.

The cylindrical lenses 21 and 22 form an image inverted in the y-direction on each of the light-receiving surfaces 6a, 6b, 6c. The binary lens arrays 23, 24 form an image erect in the x-direction on each of the light-receiving surfaces 6a, 6b, 6c. The binary lenses 25, 26 are provided as intermediate lenses for reducing the light shielded by the light-shielding plate 7 to increase the amount of light contributing to the formation of the image.

Each of the one-dimensional binary lenses constituting the binary lens arrays 23, 25, 26, 24 is constructed so that its focal length changes continuously or stepwise in the sub scanning direction in accordance with the change in the optical path from the object surface 5 to the light receiving surfaces 6a, 6b, 6c, in the same manner as in the previous embodiments.

When the object surface 5 is illuminated with a light source (not shown), the light beam emanated from the object surface 5 passes through the cylindrical lens 21, the binary lens arrays 23, 25, 26, 24, the cylindrical lens 22, and the color filters 8, 9, 10, whereby the red light beam, the green light beam, and the blue light beam are focused onto the light-receiving surfaces 6a, 6b, 6c, respectively.

Accordingly, by providing a light-receiving element (photoreceptor element) for each of the light-receiving surfaces 6a to 6c, it is possible to read the image data of the three colors simultaneously. Also, since the focal length of the binary lens is set in accordance with the optical path, the image blurring can be prevented.

In the second to fifth embodiments, although the color filters 8, 9, 10 are disposed only on one of the cylindrical lenses, the color filters may also be provided on the other one of the cylindrical lenses, or alternatively, the color filters may be provided on both of the cylindrical lenses to improve the color separation efficiency.

In the second to fifth embodiments, when the object surface 5 is illuminated with a light source and the image formed on the light-receiving surface 6 (or 6a, 6b, 6c) is received by a light-receiving sensor (photoreceptor), the signal intensity obtained from the light-receiving sensor can be made uniform for each wavelength if the area of the segment corresponding to the respective wavelength (respective color) of the one-dimensional binary lens is made equal to a reciprocal of a product of (1) a ratio of light-utilization efficiency of the optical imaging system, (2) a ratio of light quantity of the illumination light source, and (3) a ratio of the sensitivity of the light-receiving sensor for the respective wavelength.

According to the present invention, by using one-dimensional binary lenses, the optical element for forming an erect image at a magnification of 1:1 can be fabricated integrally with the optical element for obtaining a real image perpendicular to the erect image, so that the device can be simplified by reduction of the number of components.

Also, by using one-dimensional binary lenses, a lens having a gradually varying focal length can be fabricated in a plane, and a large aperture with corrected aberration is obtained, thereby providing an optical device capable of forming a bright image with little image blurring.

Further, by using one-dimensional binary lenses suitable for the wavelength of the light of each of the three fundamental colors, a color filter, and a cylindrical lens divided into three different regions, it is possible to realize an optical device for forming a color mirror image at a magnification of 1:1, which is excellent in color separability and capable of fast reading by simultaneous reading of the three colors.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. An optical device comprising an optical imaging system for forming a real image of an object on a light-receiving surface, the optical imaging system comprising first and second cylindrical lenses and first and second intermediate lenses, each of the intermediate lenses being composed of a plurality of lens elements arrayed in a line, the first and second cylindrical lenses being opposed to each other so that generatrices thereof are parallel to each other, the first and second intermediate lenses being arranged between the first and second cylindrical lenses in a direction of the generatrices so that a light beam emanated from the object is condensed onto the light-receiving surface through the first cylindrical lens, the first intermediate lens, the second intermediate lens and the second cylindrical lens, wherein each of the lens elements is formed of a one-dimensional binary lens having a light-condensing property only in the direction of the generatrices, whereby a real image by the first and second cylindrical lenses and an erect image by the first and second intermediate lenses are formed perpendicular to each other on the light-receiving surface.

2. The optical device of claim 1, wherein the one-dimensional binary lens is a lens whose focal length changes gradually in a direction showing the light-condensing property of the first and second cylindrical lenses, and the focal length increases according as an optical path increases.

3. The optical device of claim 1, wherein the first and second cylindrical lenses each comprise a lens having a curved front surface and a planar rear surface, the first and second cylindrical lenses being disposed so that the front surfaces thereof are facing away from each other, and the first and second intermediate lenses being integrally formed with the rear surfaces of the first and second cylindrical lenses, respectively.

4. The optical device of claim 1, further comprising a plurality of light-shielding plates, disposed between the first and second intermediate lenses, for preventing an optical cross talk.

5. The optical device of claim 1, further comprising a color filter disposed between the first cylindrical lens and the first intermediate lens.

6. An optical device comprising an optical imaging system for forming a real image of an object on a light-receiving surface, the optical imaging system comprising:

first and second cylindrical lenses and first and second intermediate lenses, each of the intermediate lenses being composed of a plurality of lens elements arrayed in a line, the first and second cylindrical lenses being opposed to each other so that generatrices thereof are parallel to each other, the first and second intermediate lenses being arranged between the first and second cylindrical lenses in a direction of the generatrices so that a light beam emanated from the object is condensed onto the light-receiving surface through the first cylindrical lens, the first intermediate lens, the second intermediate lens and the second cylindrical lens, each of the lens elements being formed of a one-dimensional binary lens having a light-condensing property only in the direction of the generatrices, whereby a real image by the first and second cylindrical lenses and an erect image by the first and second intermediate lenses are formed perpendicular to each other on the light-receiving surface, wherein the optical device comprises three different color filters respectively transmitting light beams of three fundamental colors, the three different color filters separating the light beam from the object into respective colors in the direction showing the light-condensing properties of the first and second cylindrical lenses, each of the binary lenses being divided into three segments for transmitting the light beams from the three different filters, each of the three segments having a wavelength property which conforms to a wavelength of the light beam from the corresponding color filter.

7. The optical device of claim 6, wherein at least one of the first and second cylindrical lenses is divided into three regions in the direction showing the light-condensing property so as to correspond to each wavelength of the three fundamental colors of light, whereby the same portion of the object is imaged onto the light-receiving surface separately for the three colors.

8. The optical device of claim 7, wherein the cylindrical lens divided into the three regions has curved surface shapes which are different from each other for the respective three regions.

9. The optical device of claim 7, wherein the cylindrical lens divided into the three regions is the second cylindrical lens whose front surface is a curved surface and whose rear surface constitutes a prism refraction surface composed of different planes forming different angles with the light-receiving surface for the three regions.

10. The optical device of claim 4, wherein the first cylindrical lens is a lens having a curved front surface and a planar rear surface, and the first intermediate lens is bonded to the rear surface of the first cylindrical lens together with the color filters.

11. The optical device of claim 6, further comprising a light source for illuminating the object and light-receiving sensors for detecting the image formed on the light-receiving surface, wherein an area of each of the divided segments is determined on the basis of a reciprocal of a product of a ratio of light-utilization efficiency of the optical imaging system, a ratio of light quantity of the illumination light source, and a ratio of sensitivity of the light-receiving sensor for each wavelength.

12. The optical device of claim 6, wherein at least one of the first and second cylindrical lenses is divided into three regions in the direction showing the light-condensing property, and the curved surface shape of each of the three regions is optimized for the wavelength of the light beam of the respective one of the three fundamental colors.

13. The optical device of claim 6, wherein the one-dimensional binary lens is a lens whose focal length changes gradually in a direction showing the light-condensing property of the first and second cylindrical lenses, and the focal length increases according as an optical path increases.

14. The optical device of claim 6, wherein the first and second cylindrical lenses each comprise a lens having a curved front surface and a planar rear surface, the first and second cylindrical lenses being disposed so that the front surfaces thereof are facing away from each other, and the first and second intermediate lenses being integrally formed with the rear surfaces of the first and second cylindrical lenses, respectively.

* * * * *